(12) United States Patent
Tealdi et al.

(10) Patent No.: US 9,201,980 B2
(45) Date of Patent: Dec. 1, 2015

(54) RECONSTRUCTING DOCUMENTS FROM N-GRAM INFORMATION

(71) Applicant: Xerox Corporation, Norwalk, CT (US)

(72) Inventors: Matias D. Tealdi, Cordoba Capital (AR); Matthias Galle, St-Martin d'Heres (FR)

(73) Assignee: XEROX Corporation, Norwalk, CT (US)

( * ) Notice: Subject to any disclaimer, the term of this patent is extended or adjusted under 35 U.S.C. 154(b) by 177 days.

(21) Appl. No.: 14/083,483

(22) Filed: Nov. 19, 2013

(65) Prior Publication Data

US 2015/0142853 A1 May 21, 2015

(51) Int. Cl.
*G06F 17/30* (2006.01)

(52) U.S. Cl.
CPC .................. *G06F 17/30958* (2013.01)

(58) Field of Classification Search
None
See application file for complete search history.

(56) References Cited

U.S. PATENT DOCUMENTS

2014/0222760 A1* 8/2014 Trachtenberg et al. ....... 707/641

OTHER PUBLICATIONS

Compeau, et al., "How to apply de Bruijn graphs to genome assembly," Nature Biotechnology, 29(11) pp. 987-91 (Nov. 2011).
Miller, et al., "Assembly algorithms for next-generation sequencing data," Genomics, 95(6) pp. 315-327 (Jun. 2010).
Pevzner, et al., "An Eulerian path approach to DNA fragment assembly" Proc. National Academy of Sciences, 98(17) pp. 9748-9753 (Aug. 2001).
Pevzner, P., "1-Tuple DNA Sequencing: Computer Analysis" Journal of Biomolecular Structure and Dynamics, pp. 063-073 (1989).
WolframMathWorld, "De Bruijn Graph" MathWorld, p. 1 (Oct. 2013), Retrieved from http://www.mathworld.wolfram.com/deBruijnGraph.html, on Nov. 8, 2013.
Tarjan, R. "Depth-first search and linear graph algorithms," SIAM Journal on Computing, 1(2) pp. 146-160 (Jun. 1972).

* cited by examiner

*Primary Examiner* — Anh Tai Tran
(74) *Attorney, Agent, or Firm* — Fay Sharpe LLP

(57) ABSTRACT

A method for reconstruction includes providing a directed input graph generated from a set of n-grams and statistics for the n-grams, edges of the graph being joined through nodes of the graph. Each edge has an associated label and a multiplicity of at least one. Each of the n-grams in the set being represented by a respective one of the labels, whereby a Eulerian cycle through the graph traverses each edge the respective multiplicity of times. Reduction rules are applied iteratively to generate a refined graph which is both irreducible and equivalent to the input graph. Information is output based on the labels of the refined graph.

20 Claims, 9 Drawing Sheets

FIG. 5 REDUCTION RULE 1

REDUCTION RULE 2

US 9,201,980 B2

RECONSTRUCTING DOCUMENTS FROM N-GRAM INFORMATION

BACKGROUND

The exemplary embodiment relates to extracting information from n-grams. It finds particular application in document reconstruction from n-gram statistics.

Organizations may see advantages to releasing part of the data they own for reasons of general good, prestige, harnessing the work of those the data is released to or to open access to new resources for financial gain. Often, it is not feasible to release the complete data due to privacy concerns, legal constraints, or economic interest. In such cases, a compromise is to release some statistics computed over the data. For example the statistics released may include n-gram counts for text documents. Here, n-grams are sequences of words of length n words.

Examples of where such information may be used include the release of copyrighted material (for example, the Google Ngram Corpus) and the exchange of phrase tables for machine translation when the original parallel corpora are private or confidential. There has been considerable interest in reconstructing at least part of a document, given the count of all its n-grams. A similar problem is solved routinely in DNA sequencing, by mapping the n-grams into a graph (the de Bruijn graph). An n-dimensional De Bruijn graph of m symbols is a directed graph representing overlaps between sequences of symbols. It has $m^n$ edges, consisting of all possible length-n sequences of the given symbols, where the same symbol may appear multiple times in a sequence. An Eulerian tour can then be found in this graph (a path through the graph which visits every edge exactly once). See, for example, Phillip E. C. Compeau, et al., "How to apply de Bruijn graphs to genome assembly," Nature Biotechnology, 29(11):987-91, November 2011, hereinafter, Compeau, et al. However, the number of possible Eulerian tours can grow faster than exponentially with the number of nodes, and only one of these tours corresponds to the original document.

It would be desirable to be able to reduce the de Bruijn graph into its most irreducible form, from which larger blocks or sub-sequences of the document can more easily be identified.

BRIEF DESCRIPTION

In accordance with one aspect of the exemplary embodiment, a method for reconstruction includes providing a directed input graph generated from a set of n-grams and statistics for the n-grams. Edges of the graph are joined through nodes of the graph. Each edge has an associated label and a multiplicity of at least one. Each of the n-grams in the set is represented by one of the labels. A Eulerian cycle through the graph traverses each edge the respective multiplicity of times. The method further includes iteratively applying a plurality of reduction rules to generate a refined graph. The reduction rules include a first reduction rule configured for identifying a division point node of the input graph, or of a refined graph generated therefrom, which divides the respective graph into at least two connected components and wherein there is a unique incoming edge to the division point node in the first connected component and a unique outgoing edge from the division point node in the second connected component. The first reduction rule is configured for generating a new edge with a label which derived from the labels of the unique incoming edge and the unique outgoing edge. A second of the reduction rules is configured for identifying a node of the input graph or of a refined graph generated therefrom which includes a first incoming edge and a first outgoing edge for which the multiplicity of one of the first incoming edge and the first outgoing edge is greater than a degree of the node minus the multiplicity of the other of the first incoming edge and the first outgoing edge. The degree of the node is a sum of incoming edges to the node, multiplied by their multiplicities. The second reduction rule is further configured for merging the first incoming edge and the first outgoing edge to create a new edge with label which is derived from the first incoming edge and the first outgoing edge. After the applying of the reduction rules, the method includes outputting information based on the labels of the refined graph.

One or more of the steps of the method may be implemented by a computer processor.

In accordance with another aspect of the exemplary embodiment, a reconstruction system includes a graphing component which generates a directed input graph from a set of n-grams and statistics for the n-grams. Edges of the graph are joined through nodes of the graph. Each edge has an associated label and a multiplicity of at least one. Each of the n-grams in the set is represented by one of the labels. A cycle through the graph traverses each edge the respective multiplicity of times. A refinement component is provided for iteratively applying a plurality of reduction rules to generate a refined graph. The reduction rules include a first reduction rule configured for identifying a division point node of the input graph, or of a refined graph generated therefrom, which divides the respective graph into at least two connected components and wherein there is a unique incoming edge to the division point node in the first connected component and a unique outgoing edge from the division point node in the second connected component. The first reduction rule is configured for generating a new edge with a label which is derived from the labels of the unique incoming edge and the unique outgoing edge. A second reduction rule is configured for identifying a node of the input graph or of a refined graph generated therefrom which includes a first incoming edge and a first outgoing edge for which the multiplicity of one of the first incoming edge and the first outgoing edge is greater than a degree of the node minus the multiplicity of the other of the first incoming edge and the first outgoing edge. The degree of the node is a sum of incoming edges multiplied by their multiplicities. The second reduction rule is configured for merging the first incoming edge and the first outgoing edge to create a new edge with a label which is derived from the first incoming edge and the first outgoing edge. A reconstruction component outputs information based on the labels of the refined graph.

One or more of the components may be implemented by a computer processor.

In accordance with another aspect of the exemplary embodiment, a method for reconstruction includes receiving a set of n-grams and statistics for the n-grams which are complete for a document corpus comprising at least one document and generating a directed input graph from the set of n-grams and statistics for the n-grams, in which edges of the graph are joined through nodes of the graph, each edge having an associated label corresponding to one of the n-grams and a multiplicity of at least one. The input graph is refined by iteratively applying a plurality of reduction rules, the reduction rules including a first reduction rule configured for identifying a division point node of the input graph, or of a refined graph generated therefrom, which divides the respective graph into at least two connected components and wherein there is a unique incoming edge to the division point node in the first connected component and a unique outgoing edge from the division point node in the second connected component, the first reduction rule configured for generating a new edge with a label which derived from the labels of the unique incoming edge and the unique outgoing edge. A second of the reduction rules is configured for identifying a node of the input graph or of a refined graph generated therefrom which includes a first incoming edge and a first outgoing edge for which the multiplicity of one of the first incoming edge and the first outgoing edge is greater than a degree of the node minus the multiplicity of the other of the first incoming edge and the first outgoing edge, where the degree of the node is a sum of incoming edges of the node multiplied by their multiplicities and for merging the first incoming edge and the first outgoing edge to create a new edge with a label which is derived from the incoming edge and the outgoing edge. The method further includes outputting information based on the labels of the refined graph.

At least one of the generating and refining may be performed with a computer processor.

DETAILED DESCRIPTION

Figure 1:
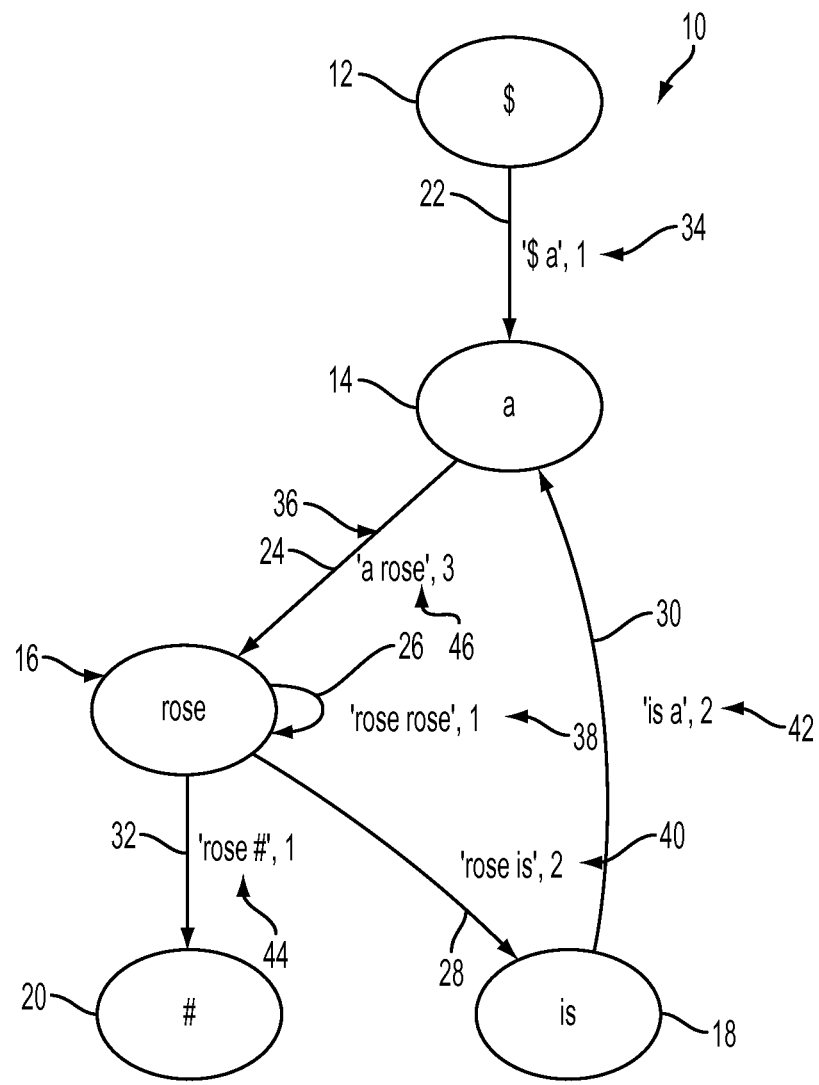
FIG. 1 illustrates an original de Bruijn graph for an example of the reduction on the sequence "$ a rose rose is a rose is a rose #"

The exemplary embodiment relates to the extraction of information from n-gram statistics. It is assumed that a set of n-grams and their statistics (e.g., number of occurrences) in a document or document corpus are provided.

Each n-gram is a sequence of length n symbols, which in the exemplary embodiment are words, and where n is at least 2. For example, n may be 2, 3, 4, 5, 10, or more, and in some embodiments, up to 20. In the case of words, for example, each word can be considered as a symbol drawn from an alphabet of symbols and each n-gram in the set is exactly n words (symbols) in length.

In some embodiments, it is also assumed that access to complete information on a document or document corpus is provided. By this it is meant that all n-grams in the document or corpus are extracted so that the n-gram statistics are complete, i.e., they include every possible n-gram and the exact number of occurrences. In other embodiments, substantially all n-grams are extracted, such as at least 90%, or at least 95%, or at least 98% of the n-grams and/or n-gram occurrences are extracted.

The words (unigrams) can be automatically identified in a text document based on the white spaces between them. The extraction of n-gram statistics may include generating a document-length sequence, which may include adding unique beginning and ending symbols which do not appear as symbols (words) in the document (here illustrated by "$" and "#"). For example, given a very small document which consists solely of the famous quote: A rose is a rose is a rose, based on Gertrude Stein's poem, the document-length sequence generated is $ A rose is a rose is a rose #. Then, starting at a first end, all possible n-grams are extracted, i.e., including overlapping n-grams. For example, if n is 2, the n-gram statistics would be as shown in TABLE 1:

TABLE 1

| n-gram | Number of occurrences |
| --- | --- |
| $ a | 1 |
| a rose | 3 |
| rose is | 2 |
| is a | 2 |
| rose # | 1 |

As will be appreciated, the n-grams may be listed in any order, such as alphabetical order, number of occurrences, or randomly. While the list is illustrated as a table, any suitable data structure may be employed for storing the n-gram statistics.

In the case of two or more documents, their sequences may be concatenated. Punctuation, capitalization, and/or numbers may be ignored in some embodiments. Other processing may also be performed.

Given such statistics, the aim is to obtain the largest possible blocks (sub-sequences) whose existence in the original corpus (sequence) can be identified with certainty. However, the method may also find application in cases were some n-grams are missing, or where it is acceptable for tradeoffs to be made between accuracy in the resulting blocks versus larger sizes of these blocks.

In the experiments described below, it is shown that blocks of an average size of at least 50 can be obtained using 5-grams, which can be used to provide additional information on the documents or to assess whether, given such n-gram statistics, recipients of the n-gram statistics may be able to derive privileged information by document reconstruction from the statistics.

In what follows, the main concepts from graph theory which are used to build upon are first described. Exemplary reduction steps are then provided, with a proof of their correctness and completeness. Experiments on the Gutenberg corpus, a collection of books whose copyright has expired, are then described, by way of example.

de Bruijn Graphs and Eulerian Tours

A string (or sequence) is a sequence of symbols drawn from an alphabet of symbols. In the present case, the symbols each represent a respective word. Strings can be indexed starting from 1 ($s[i]=i$–the symbol of s), and a concatenation of strings is denoted by: . . . .

Given a list of n-grams including a respective occurrence count of each of the n-grams, the problem of finding a possible document that generated the list can be cast as a graph problem. The graph is created as follows: one node is created for each occurrence of each n-gram, and an edge between nodes v and w is added if $v[2:n]=w[1:n-1]$, i.e., if the suffix of v is the same as the prefix of w. A prefix, in this case, corresponds to the first n−1 words in an n-gram and a suffix, to the last n−1 words of another n-gram. In the case of bigrams, each node thus corresponds to a single word and each edge to the sequence of two words.

The problem can then be resolved by finding a Hamiltonian path (a path that visits each node exactly once). Concatenating the starting node and the last symbol of all the other nodes, in the order the path visits them, reconstructs one possible document that may have generated the n-gram corpus. Unfortunately, the Hamiltonian path problem is a known NP-hard problem.

An alternative formulation however leads to an efficient solution. This formulation is also graph based, although the resulting graph is a multigraph, where nodes are connected by edges and where each edge has an associated multiplicity specifying the number of times the n-gram is repeated. The set of nodes corresponds to all different n−1 grams of the document. There are k edges between nodes u and v if u.v[n]=u[1].v and thus the n-gram u.v[n] appears k times in the original document. In the case of trigrams, for example, each node corresponds to two words and each edge to the sequence of three words. For example, from the sequence $ A rose is a rose is a rose #, one edge would correspond to rose is a and would point from a node w corresponding to rose is to a node w corresponding to is a and would have a multiplicity k of 2 as it appears twice in the sequence.

The resulting graph is called a de Bruijn graph. The problem of finding a document that generated this set of n-grams is then the equivalent of finding an Eulerian path in this graph.

For example FIG. 1 illustrates a de Bruijn graph 10 for the 2-grams (bigrams) extracted from the sequence: $ A rose rose is a rose is a rose #, which is a variation of the Gertrude Stein quote. There are five nodes 12, 14, 16, 18, 20, including three internal nodes 14, 16, 18, each corresponding to a different one of the (n−1)-grams (here unigrams) that appear in the input sequence and two terminal nodes 12, 20 corresponding to the two unique symbols not found in the vocabulary. The nodes are connected by edges 22, 24, 26, 28, 30, 32, each edge having an associated multiplicity k specifying the number of times the n-gram is repeated. Each edge has a respective label 34, 36, 38, 40, 42, 44. For example, the edge 24 has a label 36 a rose and has a multiplicity 46 of k=3, since it appears three times in the corpus of bigrams. The nodes 14, 16 connected by this edge 24 are labeled with the prefix of the bigram: a and the suffix: rose, respectively. Where the n-gram to which an edge corresponds has the same prefix and suffix, the same node serves as the prefix and the suffix, as is the case for node 16 and edge 26.

There is a well-known linear algorithm to find Eulerian paths. However, reconstructing the original document is not conclusively resolved by this. There may be more than one Eulerian path for a given graph. In particular, the exact number for directed Eulerian graphs is given by the BEST theorem which states that:

Given an Eulerian graph G=(V,E), the number of different Eulerian circuits is:

$$T_w(G) \prod_{v \in V} (d(v) - 1)! \quad (1)$$

where $T_w(G)$ is the number of trees directed towards the root at a fixed node w in G, and d(v) is the degree of node v (explained below).

A simplified example of this theorem can be seen in FIG. 1, where the following three sequences:

$ a rose rose is a rose is a rose #,
$ a rose is a rose rose is a rose #, and
$ a rose is a rose is a rose rose # all result in exactly the same set of bigrams and they are therefore indistinguishable.

The goal of the exemplary method is to find the maximal contiguous sub-sequences of words whose presence in the original text sequence is certain, given the evidence. In this example, these are the potentially overlapping sub-sequences: rose is a rose (twice); $ a rose; rose rose; and rose #.

Figure 2:
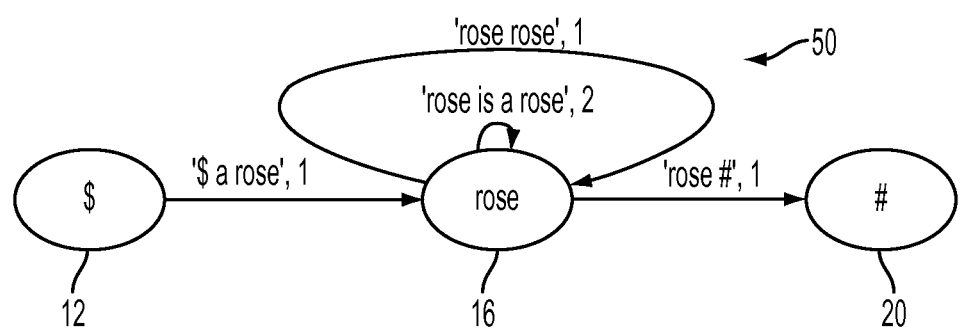
FIG. 2 shows the graph of FIG. 1 reduced to its most irreducible form.

In order to obtain this set of maximal sub-sequences, the graph is reduced to its most reducible form, where each edge corresponds to one of these sub-sequences. The formal definition of how this is achieved is given below, however, FIG. 2 shows an example of such a refined graph. The edges, rather than being limited to an n-gram in length, can be of any length than n or greater, up to the full length of the sequence from which the bigram statistics were generated.

DEFINITIONS

As can be seen from FIG. 1, the method operates with directed multigraphs, where an edge not only has a multiplicity attached to it, but also a label denoting the subsequence it represents. The following definition of graph is therefore applicable:

Definition 1: A graph G is a tuple (V,E), with V the set of nodes and E the set of edges, where each edge e is a 4-tuple of the form ($\langle$u,v,l$\rangle$,k) with u,v$\in$V; l$\in\Sigma^*$, k$\in$N; where $\Sigma^*$ is the sequence from which the n-gram words are drawn, and N represents a positive integer.

This simply states that each edge of a graph is identified by its head and tail nodes u, v and its label l, which includes a sub-sequence of words drawn from the vocabulary $\Sigma^*$. Each node corresponds to one of the n−1 grams in the sequence. However, the number of nodes is not fixed, based on the number of n-grams, but can be as few as 2 (in the case of a complete sequence being identified) and can be up to the number of different (n−1) grams (unigrams when n=2) in the sequence.

Given an edge e=($\langle$u,v,l$\rangle$,k) the following terms are used to refer to its components: tail(e)=v, head(e)=u, label(e)=l, multiplicity(e)=k.

The indegree $d_{in}(v)$ of a node v, is defined as $\Sigma_{e \in E:head(e)=v}$multiplicity(e), i.e., the number of incoming edges, weighted by their multiplicity, and the outdegree $d_{out}(v)$ is $\Sigma_{e \in E:tail(e)=v}$multiplicity(e). i.e., the number of outgoing edges, weighted by their multiplicity.

For example, in FIG. 2, the indegree of the node 16 representing rose is 4, since there are three incoming edges, two of them have a multiplicity of 1, and one has a multiplicity of 2 (i.e., indegree=2×1+2=4). The outdegree of this node is also 4.

A graph is Eulerian if it is connected and $d_{in}(v)=d_{out}(v)$ for all nodes v. In this case, the degree of the node, $d(v)=d_{in}(v)=d_{out}(v)$. This means that for any internal node, the indegree is equal to the outdegree. In what follows, the degree d(v) of the node thus refers to the indegree and outdegree. The terminal nodes 12, 20 (corresponding to the special symbols $ and #) do not follow this rule.

Also the number of different edges (as defined by their labels) entering (respectively, leaving) v, are defined as $\hat{d}$ in(v)=|{e$\in$E:tail(e)=v}| and $\hat{d}$ out(v)=|{e$\in$E:head(e)=v}|., i.e., as the number of edges that have node v as their tail or head. This value ignores the multiplicity. Thus, for example, in FIG. 1, node 14 representing a has two incoming edges ($\hat{d}$ in(v)=2) and one outgoing edge ($\hat{d}$ out(v)=1).

Furthermore, the labels determine the edges uniquely. That is, $\forall e_1, e_2 \in$E, if label($e_1$)=label($e_2$), then $e_1=e_2$. This means that no two edges can have the same label.

For adding or removing edges, the notation of E$\cup${($\langle$v,w,l$\rangle$,k)} may be used, which means that an edge gets added to the set of edges with multiplicity k if it is not yet present, or increases the respective multiplicity by k.

An Eulerian cycle through the exemplary graph is then a cycle that visits each edge e exactly multiplicity(e) times. The set of all Eulerian cycles of G is denoted by ec(G). Given one such Eulerian cycle $c=e_1, \ldots, e_n$, its label sequence is the list $l(c)=[label(e_1), \ldots, label(e_n)]$, and the sequence it represents is the concatenation of these labels: $s(c)=label(e_1).label(e_2) \ldots label(e_n)$.

The aim of the method is to find subsequences that are as long as possible yet where it can be sure that they appear in the original sequence, given the list of n-grams and their statistics. In the exemplary method, an input de Bruijn graph is generated, based on the n-gram statistics, as a starting point and then an iterative process is implemented which applies predefined rules which serve to merge some edges to generate a refined graph. The process is continued until the final edges correspond exactly to those maximal sequences. Formally, given the input graph G, the resulting refined graph G* is one that:

1. Is equivalent:

$$\{s(c): c \in ec(G)\} = \{s(c): c \in ec(G^*)\} \quad (2)$$

i.e., that the set of sequences which can be reconstructed by the concatenation of its labels in all possible Eulerian cycles for the refined graph are among (or the same as) the set of sequences that can be produced by the concatenation of the labels of the input graph in all possible Eulerian cycles; and 2. Is irreducible:

$$\nexists\, e_1, e_2 \in E^*: [label(e_1), label(e_2)] \text{ appears in all } l(c), c \in ec(G^*) \quad (3)$$

i.e., that each edge is certain to be in the sequence, since it appears in each of the possible Eulerian cycles for the graph, and that the graph cannot be reduced further, using the rules discussed below, to create a graph in which two (or more) of the edges are combined to form a single edge.

Document Reconstruction System and Method

Figure 3:
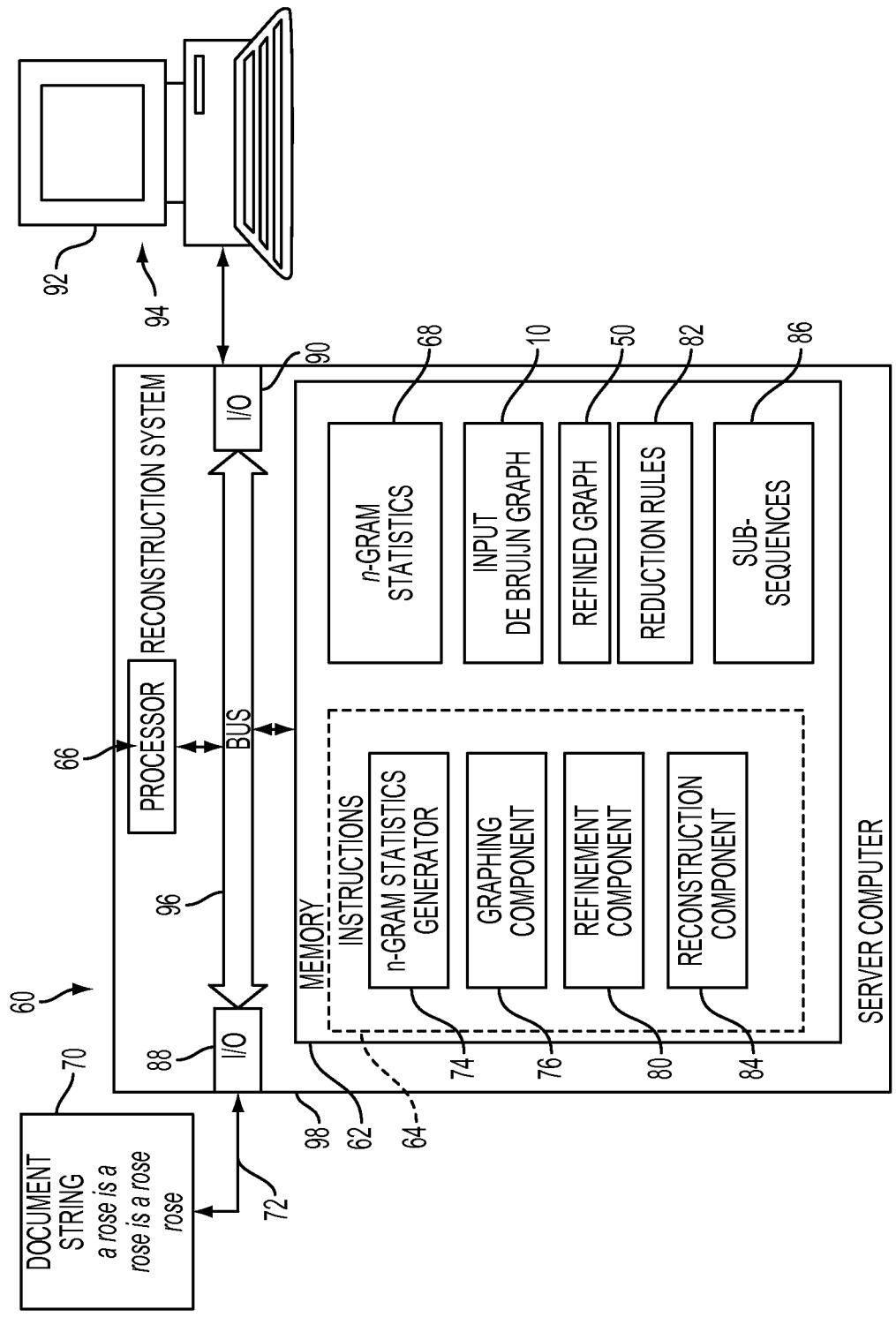
FIG. 3 illustrates a system for reconstructing documents in accordance with one exemplary embodiment.

FIG. 3 illustrates an exemplary computer implemented document reconstruction system 60. The system includes memory 62 which stores instructions 64 for performing the exemplary method and a processor 66 in communication with the memory for executing the instructions. The system has access to a list 68 of n-grams and their statistics (as exemplified in TABLE 1 above) where n is a fixed number, such as 2, 3, 4, or 5. The list 68 may have been generated from a text sequence 70 corresponding to the text of one or more documents. The words of the text sequence 70 are arranged in the same sequence as in the original document(s). The text document(s) may each comprise one or more sentences or paragraphs. The list 68 and/or text sequence 70 may be stored in memory 62 of the system or accessible from remote memory via a wired or wireless link 72, e.g., a local area network or a wide area network such as the Internet.

Optionally, the system 60 includes an n-gram statistics generator 74 for converting a text document, into a single word sequence 70 and from the word sequence, generating n-gram statistics 68 for the entire word sequence. In other embodiments, the system 60 only has access to the n-gram statistics 68 and not to the original text document and sequence 70.

A graphing component 76 generates an input directed (de Brujin) graph G 10, as discussed above, which may be stored in memory 62. The input graph 10 represents the n-gram statistics 68 and can be traversed by one or more (generally at least two) different Eulerian paths to reconstruct at least one candidate sequence, where at least one of the at least one candidate sequences corresponds to the original sequence 70. In the input graph, each different word (or symbol) in the sequence 70 is represented by a respective node 14, 16, 18 etc., and each node is connected to others of the nodes (and optionally to itself) by edges 24, 26, 28, 30 except for the first and last (terminal) nodes 12, 20, which may represent special symbols, not present in the original sequence, that are added to the beginning and end of the sequence 70, and which are connected by a respective edge to only one other node. Each edge is associated with a respective multiplicity of at least one which indicates the number of times that edge must be traversed in reconstructing a candidate sequence.

A refinement component 80 applies a plurality of reduction rules 82 for refining the input graph 10 to generate a refined graph 50, which may be stored in memory 62. One of the reduction rules applies when the graph can be subdivided into two or more connected components (sub-graphs) which meet only once at a node which serves as a division point, which yields a new edge that bypasses the division point node. Another of the reduction rules, when applied, results in the merging of two edges to generate a new edge representing a sub-sequence that is longer than n. The refinement component 80 iteratively applies the reduction rules until the refined graph is irreducible with the reduction rules. Exemplary reduction rules of these two types are described below.

A reconstruction component 84 extracts and outputs a set of sub-sequences 86 which are represented by the edges of the refined graph 50. These correspond to the set of longest subsequences which can be identified with certainty, i.e., when no further refinements to the graph 50 are possible.

The exemplary components 74, 76, 80, 84 may separate or combined and may be in the form of software implemented by hardware or hardware components.

One or more input/output devices 88, 90 enable the system 60 to communicate with one or more external devices, such as a source of the sequence 70 or n-gram statistics 68 and optionally with a display device 92, such as a computer monitor or LCD screen, which may be integrated in an associated client device 94 that is communicatively linked to the system. The hardware components 88, 90 of the system may be communicatively connected by a data/control bus 96. The system 60 may be hosted by one or more computing devices, such as the illustrated server computer 98.

The computer system 60 may include one or more computing devices, such as a PC, such as a desktop, a laptop, palmtop computer, portable digital assistant (PDA), server computer, cellular telephone, tablet computer, pager, combination thereof, or other computing device capable of executing instructions for performing the exemplary method.

The memory 62 may represent any type of non-transitory computer readable medium such as random access memory (RAM), read only memory (ROM), magnetic disk or tape, optical disk, flash memory, or holographic memory. In one embodiment, the memory 62 comprises a combination of random access memory and read only memory. In some embodiments, the processor 66 and memory 62 may be combined in a single chip. Memory 62 stores instructions for performing the exemplary method as well as the processed data 10, 50, 86.

The network interface 88, 90 allows the computer to communicate with other devices via a computer network, such as a local area network (LAN) or wide area network (WAN), or the internet, and may comprise a modulator/demodulator (MODEM) a router, a cable, and and/or Ethernet port.

The digital processor 66 can be variously embodied, such as by a single-core processor, a dual-core processor (or more generally by a multiple-core processor), a digital processor and cooperating math coprocessor, a digital controller, or the like. The digital processor 66, in addition to controlling the operation of the computer 98, executes instructions stored in memory 62 for performing the method outlined in FIG. 2. Client device 94 may be configured analogously to server 98, with memory and a processor.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

As will be appreciated, FIG. 3 is a high level functional block diagram of only a portion of the components which are incorporated into a computer system 60. Since the configuration and operation of programmable computers are well known, they will not be described further.

Figure 4:
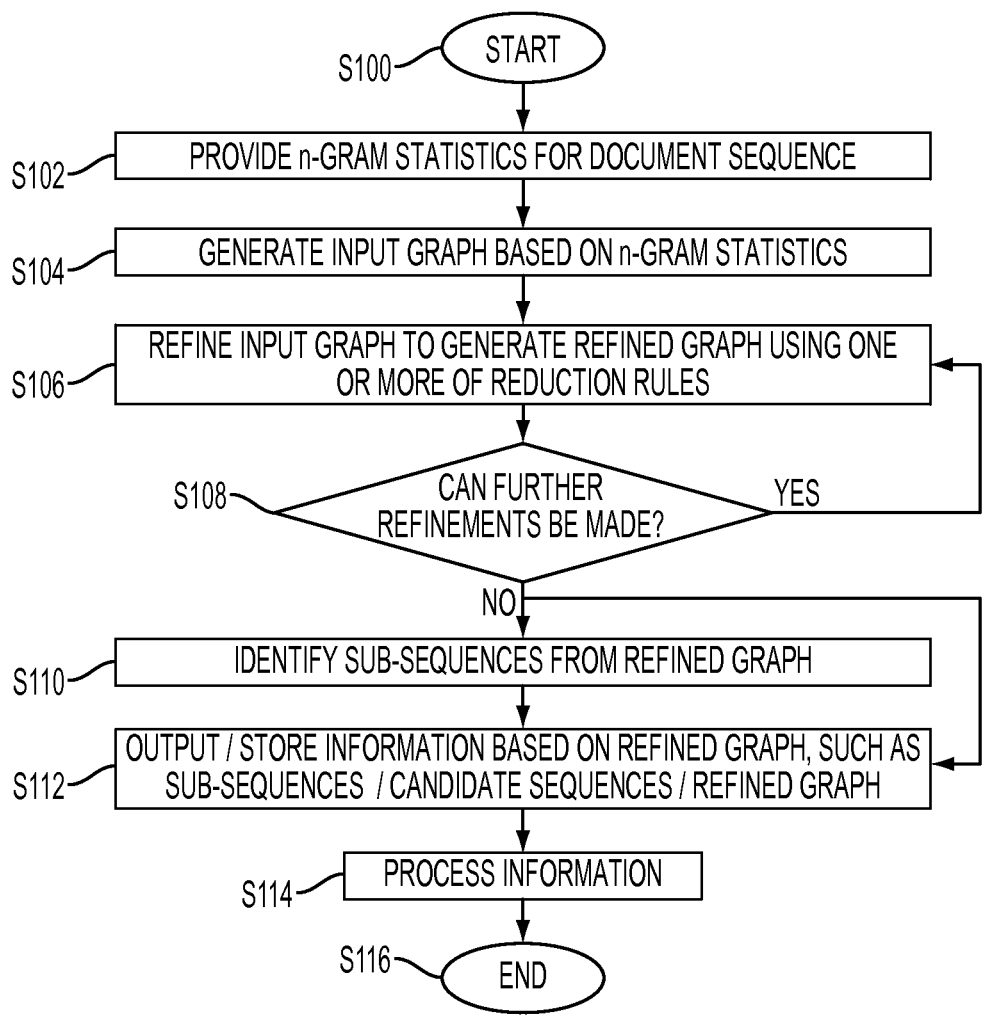
FIG. 4 illustrates a method for reconstructing documents in accordance with another exemplary embodiment.

FIG. 4 illustrates a method for reconstructing parts of a document. The method begins at S100.

At S102, a list 68 of n-grams and their statistics is provided. In some embodiments, the list may be generated by the statistics generator 74 from a document sequence 70. In other embodiments, there is no access provided to the original document(s) and sequence 70 and the list 68 is received from an external source that has access to the original document(s) from which the list of n-grams is generated.

At S104, a directed input (de Bruijn) graph 10 is generated, based on the statistics, as described above.

At S106, one or both of the reduction rules is applied to the input graph to generate a refined graph. If at S108, no further refinements can be made, the method proceeds to S110, otherwise, the method returns to S106, where one or more of the reduction rules is applied to the refined graph to generate a (further) refined graph and so forth, until the refined graph is no longer reducible by either of the reduction rules.

At S110, the refined graph is processed by the reconstruction component to identify the maximal sub-sequences corresponding to the edges and at S112, and information is output which may include one or more of: a) some or all of these sub-sequences, b) the refined graph 50, and c) a set of one or more candidate sequences corresponding to the refined graph. The information may be output, e.g., to a memory storage device and/or to display device 92, which may display the subsequences/graph/candidate sequences to a user.

In the case where the user of the system has access to the documents from which the n-gram statistics are generated, an evaluation may be made as to whether the release of the n-gram statistics may provide too much information about the original documents. Up to this point, the sub-sequences output correspond to the most optimistic case of what someone receiving the n-gram statistics can infer with certainty. Thus, for example, in the case of confidential documents, an assessment can be made as to whether the obtained sub-sequences would provide sufficient information to a recipient of the n-gram statistics to constitute a breach of confidentiality. If so, it may be decided that the n-gram statistics should not be released for that document or document corpus or that only n-gram statistics of up to a certain length of n should be released. In the case of phrase tables, for example, some of the phrases could be removed.

Optionally, at S114, the information output at S112 may be further processed. For example, given a set of sub-sequences, rules may be applied for concatenating two or more of the subsequences to form a larger sub-sequence. For example, a sub-sequence represented by an edge which ends at a node may be combined with a sub-sequence represented by an edge starting at that node, when the rules are satisfied. The rules may be grammar based. For example, the rules may require that certain grammatical rules of sentence structure be obeyed, which may depend on the language. For example, in English a plural noun should be followed by a plural verb rather than a singular verb, etc. Where the number of possible sub-sequences that can be combined in this way is relatively small, the combination which satisfies the most grammar rules may be selected. As will be appreciated, the resulting larger sub-sequences are not guaranteed to be present in the original sequence, in the same way as those of the refined graph, since errors may arise in the application of the rules. In some embodiments, a human reviewer could evaluate the combinations proposed and determine whether they are likely.

The method ends at S116.

The method illustrated in FIG. 4 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 98, (for example, an internal hard drive of RAM), or may be separate (for example, an external hard drive operatively connected with the computer 98), or may be separate and accessed via a digital data network such as a local area network (LAN) or the Internet (for example, as a redundant array of inexpensive of independent disks (RAID) or other network server storage that is indirectly accessed by the computer 98, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer (s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 4, can be used to implement the method for document reconstruction. As will be appreciated, while the steps of the method may all be computer implemented, in some embodiments one or more of the steps may be at least partially performed manually.

As will be appreciated, the steps of the method need not all proceed in the order illustrated and fewer, more, or different steps may be performed.

Further details of the system and method will now be described.

Creation of Input Graph

Various methods and software packages exist for creation of a de Bruijn graph 10 based on n-gram statistics. See, for example, Compeau, et al. and Weisstein, Eric W., "De Bruijn Graph", *Math World*, October 2013.

For example, a node is initially created for each unigram present in the n-gram list. For example, in the case of the list shown in TABLE 1, a node is created for $, #, a, rose, and is. Each node is connected by an edge to each other node (or to itself) for which there is an n-gram in the list in which the two node values (here, unigrams) are present, one at the beginning and the other at the end of the n-gram. The edge is labeled with the number of occurrences k of this n-gram.

Reduction Steps

As discussed above, given a de Bruijn graph G, the goal is to find an equivalent graph G* such that the Eulerian cycles (as defined by their labels) of both graphs are equal and such that G* cannot be reduced further. To achieve this, a series of reduction steps is performed which preserve Eulerian cycles (correctness), and which are complete in the sense that their successive application ensures an irreducible Eulerian graph.

For this, a further definition is employed, that of division point:

Definition 2: A node x is a division point of an Eulerian graph G, if there exists nodes v, w (not necessarily different) for which all non-empty paths from v to w, and from w to v go through x. (i.e., for all possible Eulerian paths).

This is similar to the concept of articulation points but it also includes self-loops (because v may be equal to w). See Robert Tarjan, "Depth-First Search and Linear Graph Algorithms," SIAM Journal on Computing, 1(2):146-160, June 1972, for a discussion of articulation points.

Removing any division point splits the graph into two or more connected components that are themselves Eulerian graphs. This may be defined formally as:

Definition 3: If x is a division point of an Eulerian graph G=(V,E) then it generates graphs $G_i$, where there is one $G_i$ for each:

a) self-loop $e=\{\langle x,x,l,\rangle k\}$. In this case $G_i=\{\{x\},\{e\}\}$ b) connected component that remains by eliminating x. In this case, $V_i$ will be the nodes of this component, plus x.

$E_i=\{e:\text{head}(e),\text{tail}(e)\epsilon V_i, e \text{ is not a self-loop over } x\}$ Each connected component $G_i$ contains an Eulerian circuit. For the self-loops, this is readily seen. For the other cases, they are connected by definition, and the degrees of nodes different than x are not modified, so they are balanced. The copy of x in each graph remains balanced. This is true because G had an Eulerian circuit, and the only way of crossing components is through x. Each circuit that leaves x to pass into a first connected component $G_i$ has to return to x (from the same component because x is division point) before visiting another component. This observation that each Eulerian circuit inside a component is independent of what occurs in other components facilitates the reduction steps.

Because all Eulerian circuits have to cross x, the division points are a natural point to try to reduce the graph. However, the numbers of different incoming and outgoing edges from the same component are also taken into account by the first reduction rule (Reduction Rule 1). The second reduction rule (Reduction Rule 2) then merges edges within one of the components (if two or more components have been generated. In the exemplary embodiment, the system makes an attempt to apply Rule 1 first, before moving on to Rule 2. The method may then return to Rule 1, or to repeat rule 2.

Reduction Rule 1:

Let G=(V,E) be an Eulerian graph and x∈V a division point that divides G into exactly two connected components $G_1, G_2$. If $$\hat{d}_{in_{G_1}}(x) = 1$$

and $$\hat{d}_{out_{G_2}}(x) = 1$$

(these unique edges are denoted as ($\langle v,x,l \rangle$, p) and ($\langle x, w, t \rangle$, k), respectively), a refined graph G'=(V', E') can be defined such that:

$$E' = (E \setminus \{(\langle v,x,l \rangle, 1), (\langle x,w,t \rangle, 1)\}) \cup \{(\langle v,w,l.t \rangle, 1)\}$$

i.e., the edges of the refined graph are the edges of the input graph, except for that the multiplicity of the unique edges is reduced by one and that there is a new edge whose label is the union of those of the two unique edges and which has a multiplicity of 1, and where:

$$V' = V$$

(i.e., the nodes are the same).

Figure 5:
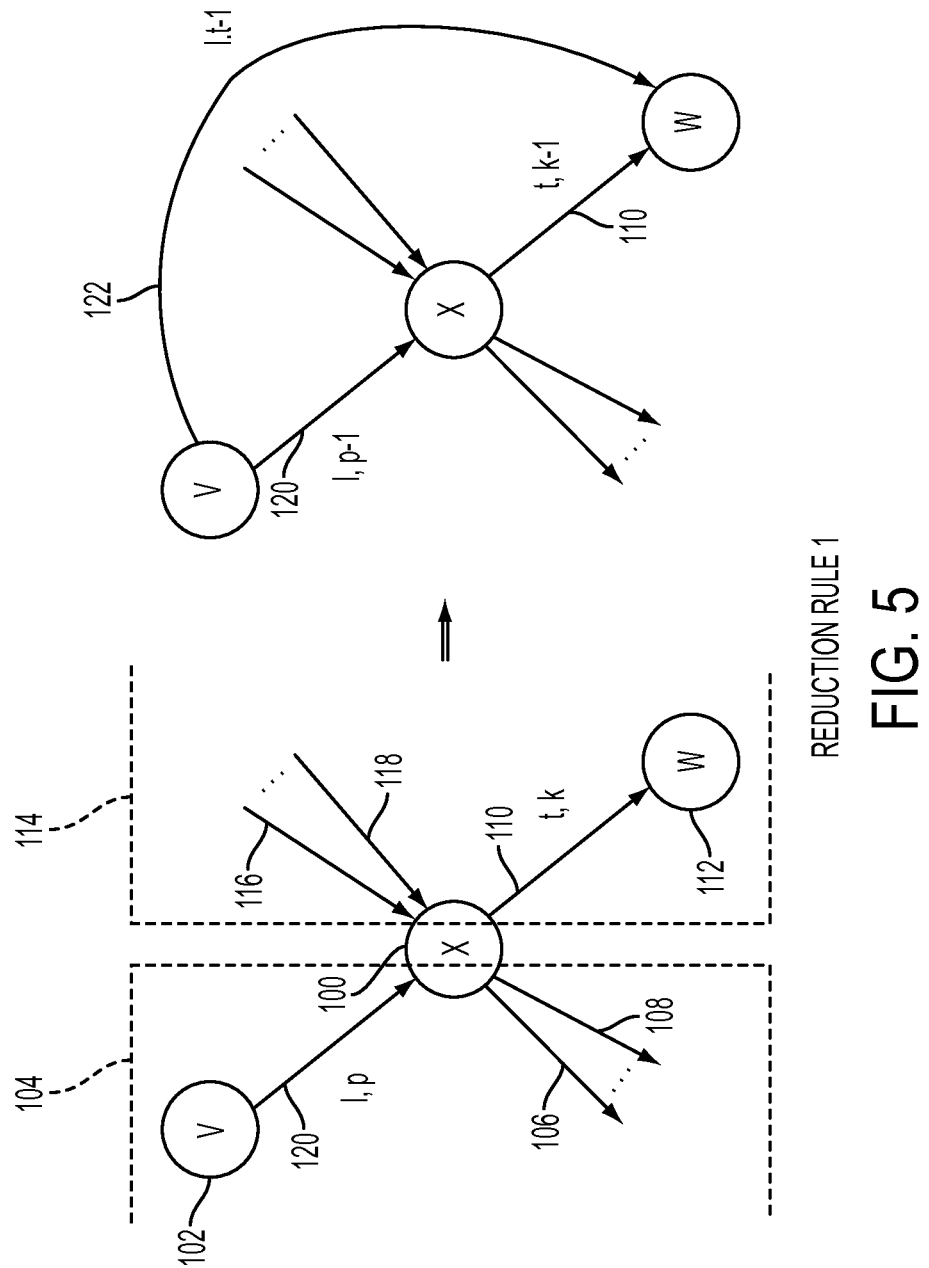
FIG. 5 illustrates application of Rule 1 on an exemplary graph.

This rule is illustrated in FIG. 5. Here, there is a node 100, labeled x which serves as a division point. This is because there exists a first node 102 labeled v, in one part 104 of the graph, through which all but one outgoing edges 106, 108 from node 100 (i.e., except for one edge 110 to a second node 112 labeled w), are connected to node x. Additionally, there is a node w, in a second part 114 of the graph, through which all but one incoming edges 116, 118 to node 100 (i.e., except for one edge 120 from the first node v), are connected to node x. Put another way, the number of different incoming edges 120 to x in component 1 (defined by part 104) is equal to 1 (i.e., $$\hat{d}_{in_{G_1}}(x) = 1),$$

thus there is a unique (single) incoming edge 120 in component 1; and the number of different outgoing edges 110 from x in component 2 (defined by part 114) is also equal to 1 (i.e., $$\hat{d}_{out_{G_2}}(x) = 1),$$

thus there is a unique (single) outgoing edge 110 in component 2. Accordingly, these two unique edges 120, 110 can be merged to form a single edge 122 in the refined graph with a label which is derived from (the union) of the labels of the incoming and outgoing edges 120, 110. For example, if the label of edge 120 is a rose, and the label of edge 110 is rose is, the union of the labels is a rose is (i.e., the new label for edge 122 is generated by removing the suffix (the unigram corresponding to its node v) of the first edge and concatenating the prefix of the first edge with the label of the second edge, or vice versa-combining the suffix of the second edge with the first edge); more generally, removing the overlapping part of the two edges.

Note that this rule does not eliminate nodes, but there is at least one additional edge 122, which bypasses x.

Rule 1 may, in some cases, be applied to more than one node, where the second and subsequent times, it is applied on a component of the graph.

As will be appreciated, there may be cases where Rule 1 cannot be applied to the input graph, and the method then proceeds to Rule 2.

Reduction Rule 2:

Let G=(V,E) be an Eulerian graph, with a node x∈V with one or more incoming edges ($\langle v_1,x,l_1 \rangle$, $p_1$), ..., ($\langle v_n,x,l_n \rangle$, $p_n$) and one or more outgoing edges ($\langle x,w_1,t \rangle$,$k_1$) ... ($\langle x,w_m, t_m \rangle$,$k_m$).

Then, where there exists a 1≤i≤n (first incoming edge) and a 1≤j≤m (first outgoing edge) such that either of the following is true (both are equivalent statements):

a) $p_i > d(x) - k_j$ (i.e., the multiplicity $p_i$ of the first incoming edge is greater than the degree $d(x)$ (i.e., indegree or outdegree) of the node minus the multiplicity of the first outgoing edge)

b) $k_j > d(x) - p_i$ (i.e., the multiplicity $k_j$ of the first outgoing edge is greater than the degree $d(x)$ (i.e., indegree or outdegree) of the node minus the multiplicity of the first incoming edge)

(as noted above, the indegree and outdegree are the same)

Then a refined graph G'=(V',E') is defined, such that $$E' = E \setminus (\{\langle v_i,x,l_i \rangle, a), \langle (x,w_j,t_j), a)\}) \cup \{\langle v_i,w_j,l_i,t_j \rangle, a)\} \quad (4)$$

where: a is the multiplicity of the new edge created from the union of the first incoming and outgoing edges, with a multiplicity a and has a value:

$$a = p_i - (d(x) - k_j) \quad (5)$$

Then, if $a=d(x)$ then V' is set to V\{x}, (i.e., x is no longer a node of the refined graph if the multiplicity of the new edge is equal to the indegree/outdegree of the node). If not, the nodes remain unmodified (V'=V), i.e., the refined graph has the same nodes, but the edges between them are different).

Figure 6:
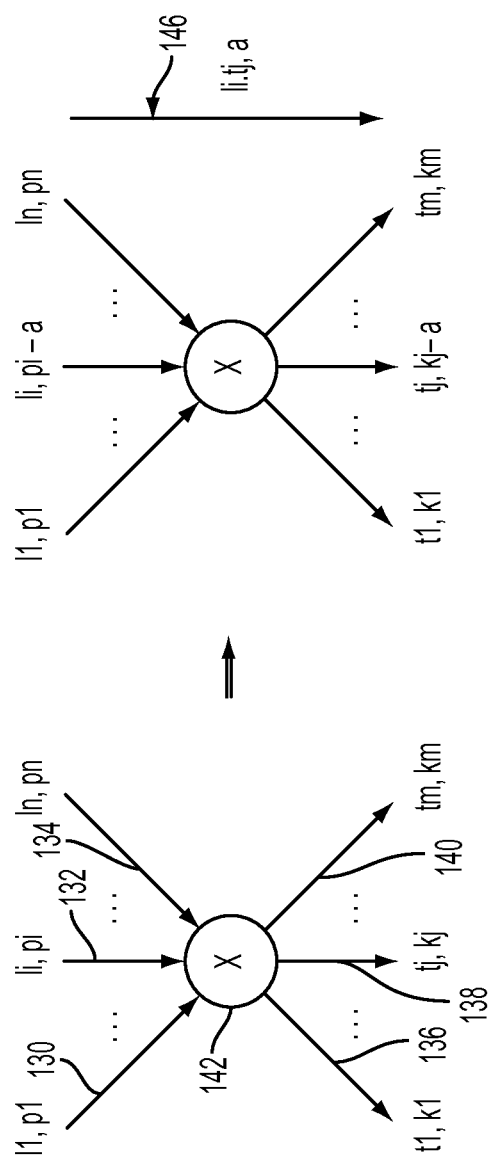
FIG. 6 illustrates application of Rule 2 on an exemplary graph.

Reduction rule 2 can be applied on any node. FIG. 6 illustrates this rule. Given a node X with one or more incoming edges and one or more outgoing edges where it can be certain that a respective one of the incoming edges must be followed by a respective one of the outgoing edges (here the edges labeled li and tj, then a new edge is added which is the concatenation of li and tj with a multiplicity a of at least 1.

As an example, consider in FIG. 6 that there are three incoming edges 130, 132, 134 and three outgoing edges 136, 138, 140 to a node 142 of a directed graph. Assume that the incoming nodes have multiplicities of 3, 2, and 1, respectively, and that outgoing edges have multiplicities of 1, 1, and 4, respectively. Then applying rule 2b) for edges 130 and 140, 4>(6−3), so the rule is satisfied, and from Eqn. 5, a=3−(6−4)=1. A new edge 146 is therefore created in the refined graph with a multiplicity of 1. In this example, edges 130 and 140 remain, with reduced multiplicities of 3−1=2 and 4−1=3, respectively. Edge 146 is labeled with the union of the labels of edges 130 and 140, as discussed above. The method can be repeated on the node 142 until no further reduction steps are possible (in the example case, no further reduction steps can be performed at this time).

A simplified case of Reduction Rule 2 can be illustrated in FIG. 1, where the node 18 representing is has one incoming edge 28 with a label rose is and one outgoing edge 42 with a label is a. It is clear that in every possible cycle the same outgoing edge 42 follows the incoming edge 28 (since there are no other possible paths from node 18 in this case), and thus the labels can be combined to produce a new edge labeled rose is a with a multiplicity of 2. In this example, the node 18 is then eliminated, reducing the number of nodes in the refined graph.

The Reduction Rule 2 may then be applied to other nodes in the refined graph.

In some cases, Rule 2 is applied as a sequence of sub-rules, where the easiest cases are first identified, such as those nodes which have only one incoming edge and one outgoing edge, as for node 18 of FIG. 1, which therefore are automatically merged, before examining the more complex cases where there are two or more incoming/outgoing edges of a node and therefore the indegree of the node and multiplicities of the edges are taken into account.

Correctness and Completeness

It can be demonstrated that the reduction steps defined above satisfy both Equation 2 (correctness) and that their successive application results in a graph satisfying Equation 3 (completeness).

1. Correctness

It can be shown that for both steps, a single application results in an equivalent graph:

Rule 1: This rules is applied if there are exactly two components $G_1, G_2$ and where to go from one component $G_1$ to another component $G_2$, a node x has to be used. The only way of reaching x through $G_1$ is to go through a first node v, and the only way of leaving x to pass through $G_2$ is to go through a second node w. Therefore, in all Eulerian circuits [label(v), label(w)] appears at least once and the two edges from v to x and x to w can be merged into one edge from v to w.

Rule 2: This rule can be considered in two cases, depending on whether x is division point or not:

If x is not a division point, then an incoming path can take any outgoing path and still result in an Eulerian cycle. This is an application of the pigeonhole principle: there are $d(x) - p_i$ incoming edges that do not have label $l_i$ and which, in principle, can take any of the outgoing edges. Even if they all leave x through edge $t_j$, there would still be $k_j - (d(x) - p_i)$ free $t_j$ edges to use which have to take care of some of the remaining $l_i$ edges. Therefore, in all Eulerian circuits, $[l_i, t_j]$ appears at least $k_j - (d(x) - p_i)$ times, which can be modeled explicitly by creating that edge with its corresponding multiplicity.

In the case where x is a division point, Rule 2 is not applied on edges from different components, because $d - k_j \leq p_i$ if $t_j$ and $l_i$ belong to different components. But inside the same component, the same principle applies as before: any incoming edge can be followed by any outgoing edge.

2. Completeness

Suppose that G* is such that neither rule can be applied. It can be shown that G* satisfies Equation 3. It may be noted that because in any step, the total number of edges (counted as the total sum of multiplicities) decreases, successive applications of both rules will eventually lead to a graph where neither rule can be applied.

One way this can be demonstrated is to show that any node of G* is ambiguous, in the sense that an incoming edge does not determine univocally, for all Eulerian cycles, which outgoing edge to take. The following cases will now be described, depending if a node x is division point, and if it is, into how many components it divides the graph.

a) x is Not a Division Point

In particular, this means that after leaving x through any edge, an Eulerian circuits can re-visit x through any of the incoming edges (if not, it would be possible divide the graph at x). Furthermore, as for all other nodes of G*, it holds that multiplicity($e_i$)≤d(x)−multiplicity($e_j$) for all incoming edges $e_i$ and outgoing edges $e_j$. Therefore, no single incoming edge $e_i$ can exhaust all but one outgoing edges, and therefore force any future incoming through $e_i$ to leave through this single outgoing edge. Because any combination of incoming and outgoing edges result can result in a valid Eulerian cycle, this concludes this case.

b) x is Division Point and Divides G in Exactly Two Components

Let be $G_1,G_2$ these two components. Because the precondition of rule 1 does not hold, $$\hat{d}_{in_{G_1}} > 1 \text{ or } \hat{d}_{out_{G_2}} > 1$$

and additionally $p_i$≤d(x)−$k_j$ for all incoming edges i and outgoing edges j. But now the same argument applies as in a), as $G_1,G_2$ are Eulerian. For the crossing point, when the path leaves $G_1$ to enter $G_2$, suppose that $$\hat{d}_{out_{G_2}} > 1$$

(if not, then $$\hat{d}_{in_{G_1}} > 1$$

and the argument is symmetric). This means that there are at least two possibilities of continuing into $G_2$ from x. Now, any of these possibilities results in a valid Eulerian cycle, because moving out of $G_2$ the path will have to pass through x again.

c) x is Division Point and Divides G into More than Two Components

Let these three or more components be $G_1,G_2, \ldots, G_n$. Suppose that [$l_1,l_2$] appears in all Eulerian circuits, and that is an incoming edge ($e_1$) of x while $l_2$ is outgoing ($e_2$). If $e_1 \in E_{i_1}$, then $e_2$ cannot be also in $E_{i_1}$, due to a similar argument as before and because the precondition of Rule 2 does not hold. Suppose therefore that it belongs to $E_{i_2} \neq E_{i_1}$. But because the Eulerian circuits of the $G_i$'s are independent, it is possible to construct a different Eulerian circuit that enters $G_{i_3} \neq G_{i_1}, G_{i_2}$ after using $e_1$ and before using $e_2$.

In some embodiments, the order in which the rules are applied may influence the set of maximal subsequences which are output. Accordingly, the method may be repeated one or more times, changing the order in which the steps are applied, or the nodes to which they are applied, to determine whether there are different subsequences which may be produced.

Without intending to limit the scope of the exemplary embodiment, the following examples demonstrate the applicability of the method.

EXAMPLES

Experiments were performed on English out-of-copyright books (430 books) from the Gutenberg Project (www.gutenberg.org/). All documents were tokenized using white spaces as segmentation points and n-grams were extracted considering words as atomic symbols.

Figure 7:
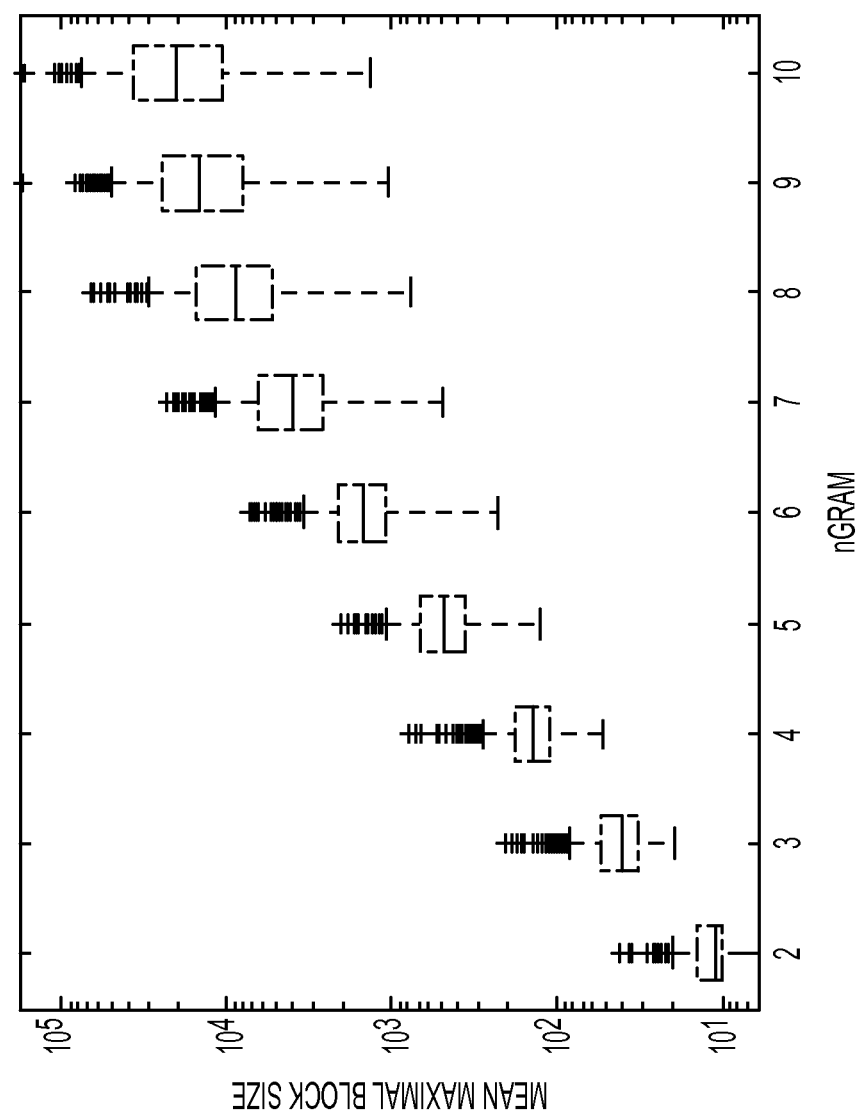
FIG. 7 illustrates mean maximal block (sub-sequence) size, on 436 books of the Gutenberg Project.
Figure 8:
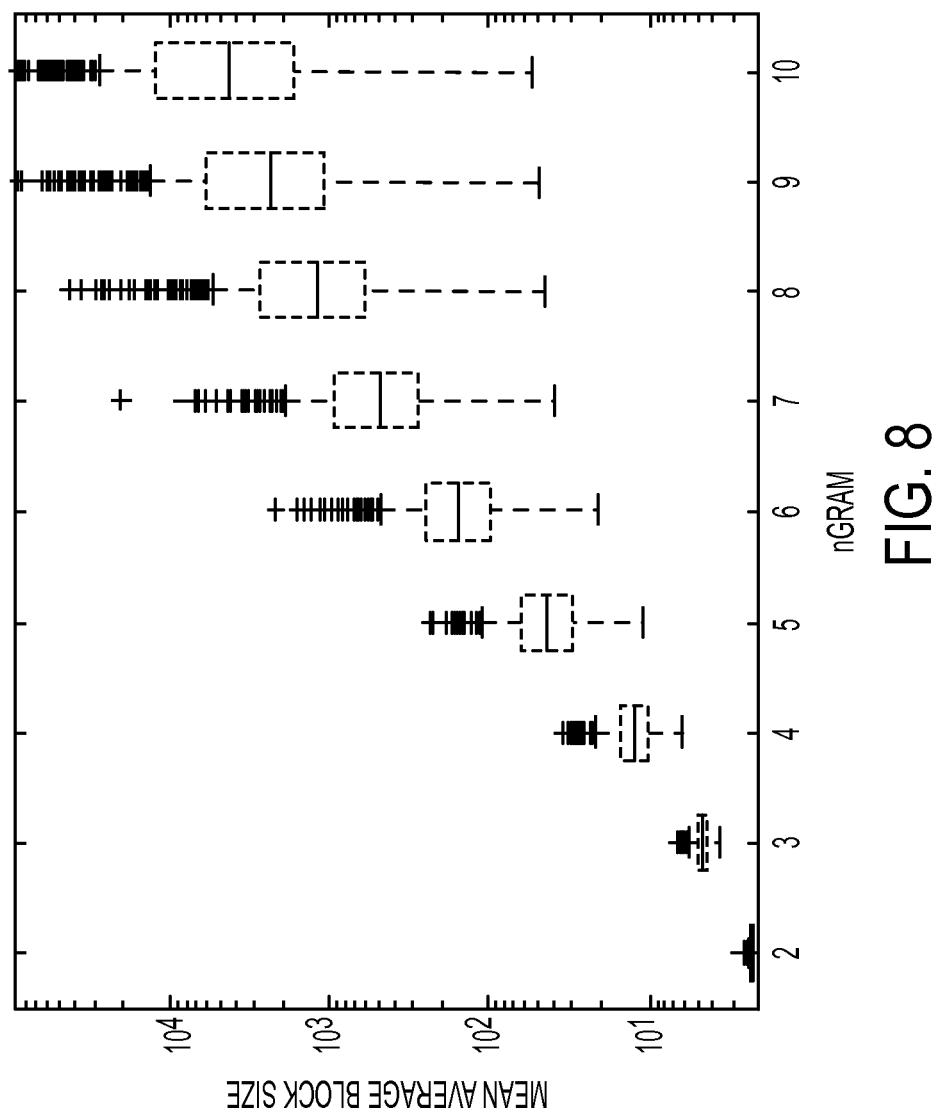
FIG. 8 illustrates average block (sub-sequence) size, on 436 books of the Gutenberg Project.
Figure 9:
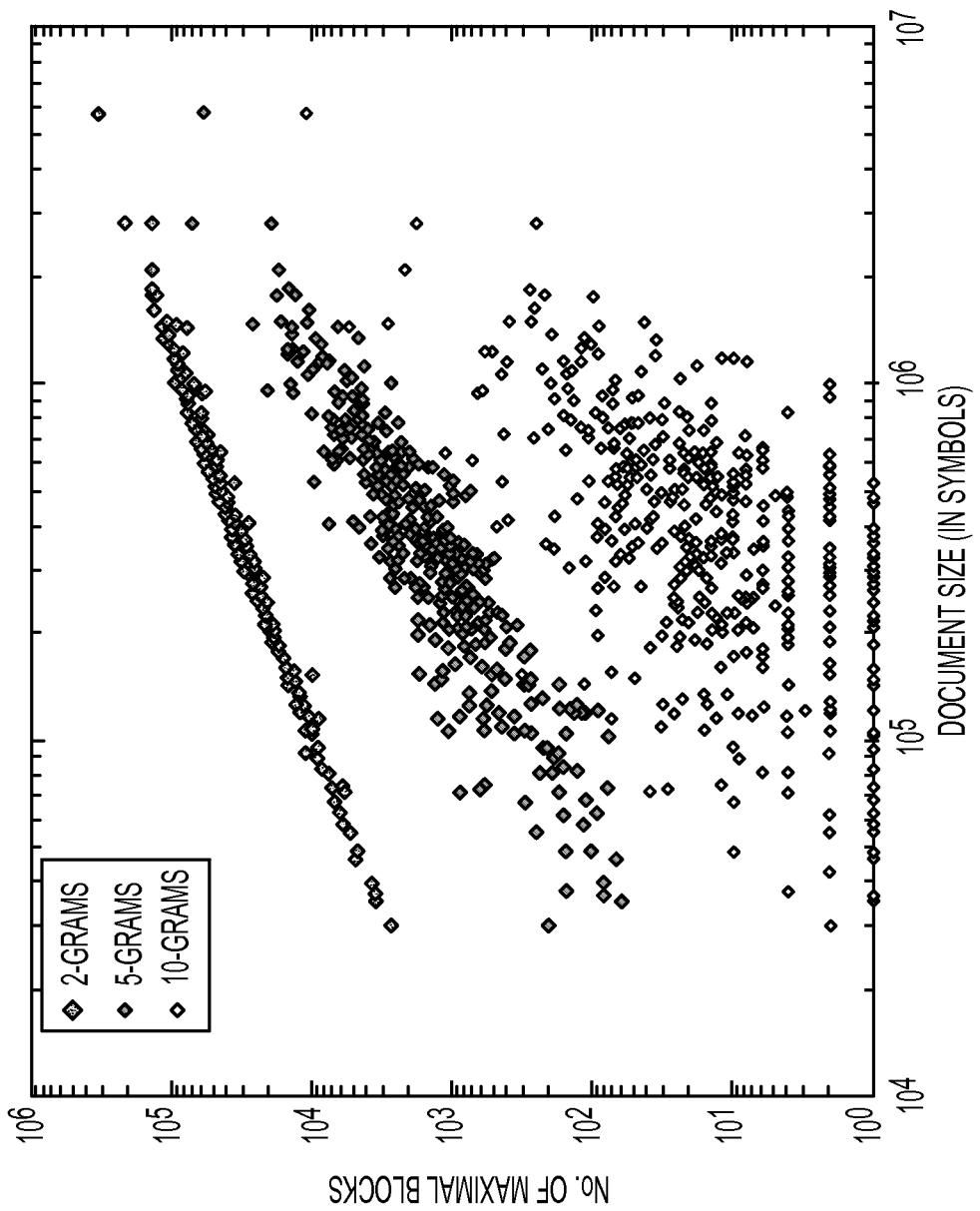
FIG. 9 is a graph of number of blocks as a function of document size.

The experiments presented here only used Rule 2. The final results therefore should be better when Rule 1 is also implemented. The books were considered independently and the reduction steps were run on each one separately. FIG. 7 is a boxplot of the mean of the maximal sub-sequence (block) size obtained for each book (note the logarithmic scale), as a function of the n-gram size. The horizontal line in each box is the median of the mean maximal block sizes. The box captures 50% of the datapoints, the upper and lower dashed lines each capture 25% of datapoints, except for outliers, shown above the upper dashed line. FIG. 8 shows the same, but for the mean of the average size. FIG. 9 illustrates the effect of the length of the book for different sizes of n. The graph indicates that for small values of n, the longer the book, the more maximal blocks there are (as the ambiguity increases). For larger values of n (such as 10) many books can be retrieved perfectly, but even for reasonable values of n, the average maximal sub-sequence size is good (52:16 for n=5).

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for reconstruction comprising:
   providing a directed input graph generated from a set of n-grams and statistics for the n-grams, edges of the graph being joined through nodes of the graph, each edge having an associated label and a multiplicity of at least one, each of the n-grams in the set being represented by a respective one of the labels, whereby a Eulerian cycle through the graph traverses each edge the respective multiplicity of times;
   with a processor, iteratively applying a plurality of reduction rules to generate a refined graph, the reduction rules comprising:
      a first reduction rule configured for identifying a division point node of the input graph, or of a refined graph generated therefrom, which divides the respective graph into at least two connected components and wherein there is a unique incoming edge to the division point node in the first connected component and a unique outgoing edge from the division point node in the second connected component, the first reduction rule configured for generating a new edge with a label which is derived from the labels of the unique incoming edge and the unique outgoing edge; and
      a second reduction rule configured for identifying a node of the input graph or of a refined graph generated therefrom which includes a first incoming edge and a first outgoing edge for which the multiplicity of one of the first incoming edge and the first outgoing edge is greater than a degree of the node minus the multiplicity of the other of the first incoming edge and the first outgoing edge, where the degree of the node is a sum of incoming edges of the node multiplied by their multiplicities, the second reduction rule configured for merging the first incoming edge and the first outgoing edge to create a new edge with a label which is derived from the first incoming edge and the first outgoing edge; and
   after the applying of the plurality of reduction rules, outputting information based on the labels of the refined graph.

2. The method of claim 1, wherein the output information includes labels of at least some of the edges of the refined graph.

3. The method of claim 1, wherein the n-grams comprise sequences of words.

4. The method of claim 1, wherein the method further comprises generating the input graph from the n-grams and n-gram statistics.

5. The method of claim 1, wherein the n-grams and n-gram statistics have been generated from a sequence of symbols.

6. The method of claim 5, wherein the sequence of symbols comprises symbols corresponding to all the words of at least one document.

7. The method of claim 6, wherein the sequence of symbols further comprises unique beginning and ending symbols that are not present in the at least one document, each of the unique symbols being present in a respective one of the n-grams.

8. The method of claim 1, wherein when the plurality of reduction rules are applied, the refined graph is equivalent to the original graph in that each graph is traversable by at least one Eulerian cycle, each of the at least one Eulerian cycles corresponding to a candidate sequence of the symbols, and wherein each of the candidate sequences of symbols for the refined graph corresponds to a respective candidate sequence for the input graph.

9. The method of claim 1, wherein when the first reduction rule is applied, the refined graph generated by application of the rule has the same nodes as in the graph from which it was generated.

10. The method of claim 1, when the first reduction rule is applied, the refined graph generated by application of the rule has a set of edges which are the same as a set of edges of the graph from which it was generated, except that it includes the new edge with a multiplicity of 1 and a multiplicity of the unique incoming and outgoing edges is reduced by one.

11. The method of claim 1, wherein when the first reduction rule is applied, the new edge either:
   links first and second nodes which are connected to each other through the division point node by the unique incoming edge and the unique outgoing edge; or
   links a node to itself that is connected to itself through the division point node by the unique incoming edge and the unique outgoing edge.

12. The method of claim 1, wherein in the first and second components, there exists a node, which are not necessarily different from each other, for which all non-empty paths between the nodes pass through the division point.

13. The method of claim 1, wherein in the second reduction rule, wherein if the node is a division point node, the rule considers only edges from one of the components, otherwise, the degree considers all edges of the node.

14. The method of claim 1, wherein each of the n-grams in the set has a same number of symbols.

15. The method of claim 1, wherein the input directed graph comprises a de Bruijn graph.

16. The method of claim 1, wherein the Eulerian cycle of the input graph comprises a plurality of Eulerian cycles, each of the Eulerian cycles generating a respective candidate sequence of symbols derived from the labels of the edges in an order in which they are traversed.

17. The method of claim 1, wherein the reduction rules are applied until the refined graph is not further reducible with the reduction rules.

18. A computer program product comprising a non-transitory recording medium storing instructions, which when executed on a computer causes the computer to perform a method for reconstruction comprising:
   providing a directed input graph generated from a set of n-grams and statistics for the n-grams, edges of the graph being joined through nodes of the graph, each edge having an associated label and a multiplicity of at least one, each of the n-grams in the set being represented by a respective one of the labels, whereby a Eulerian cycle through the graph traverses each edge the respective multiplicity of times:
   iteratively applying a plurality of reduction rules to generate a refined graph, the reduction rules comprising:
      a first reduction rule configured for identifying a division point node of the input graph, or of a refined graph generated therefrom, which divides the respective graph into at least two connected components and wherein there is a unique incoming edge to the division point node in the first connected component and a unique outgoing edge from the division point node in the second connected component, the first reduction rule configured for generating a new edge with a label which is derived from the labels of the unique incoming edge and the unique outgoing edge; and
      a second reduction rule configured for identifying a node of the input graph or of a refined graph generated therefrom which includes a first incoming edge and a first outgoing edge for which the multiplicity of one of the first incoming edge and the first outgoing edge is greater than a degree of the node minus the multiplicity of the other of the first incoming edge and the first outgoing edge, where the degree of the node is a sum of incoming edges of the node multiplied by their multiplicities, the second reduction rule configured for merging the first incoming edge and the first outgoing edge to create a new edge with a label which is derived from the first incoming edge and the first outgoing edge; and
   after the applying of the plurality of reduction rules, outputting information based on the labels of the refined graph.

19. A reconstruction system comprising:
   a graphing component which generates a directed input graph from a set of n-grams and statistics for the n-grams, wherein edges of the graph are joined through nodes of the graph, each edge having an associated label and a multiplicity of at least one, each of the n-grams in the set being represented by a respective one of the labels, whereby a cycle through the graph traverses each edge the respective multiplicity of times;
   a refinement component for iteratively applying a plurality of reduction rules to generate a refined graph, the reduction rules comprising:
      a first reduction rule configured for identifying a division point node of the input graph, or of a refined graph generated therefrom, which divides the respective graph into at least two connected components and wherein there is a unique incoming edge to the division point node in the first connected component and a unique outgoing edge from the division point node in the second connected component, the first reduction rule configured for generating a new edge with a label which derived from the labels of the unique incoming edge and the unique outgoing edge; and
      a second reduction rule configured for identifying a node of the input graph or of a refined graph generated therefrom which includes a first incoming edge and a first outgoing edge for which the multiplicity of one of the first incoming edge and the first outgoing edge is greater than a degree of the node minus the multiplicity of the other of the first incoming edge and the first outgoing edge, where the degree of the node is a sum of incoming edges of the node multiplied by their multiplicities, the second reduction rule configured for merging the first incoming edge and the first outgoing edge to create a new edge with a label which is derived from the first incoming edge and the first outgoing edge;

a reconstruction component for outputting information based on the labels of the refined graph; and a processor which implements the graphing component, reconstruction component, and reconstruction component.

20. A method for reconstruction comprising:

receiving a set of n-grams and statistics for the n-grams which are complete for a document corpus comprising at least one document;

generating a directed input graph from the set of n-grams and statistics for the n-grams, in which edges of the graph are joined through nodes of the graph, each edge having an associated label corresponding to one of the n-grams and a multiplicity of at least one;

refining the input graph by iteratively applying a plurality of reduction rules, the reduction rules comprising:

a first reduction rule configured for identifying a division point node of the input graph, or of a refined graph generated therefrom, which divides the respective graph into at least two connected components and wherein there is a unique incoming edge to the division point node in the first connected component and a unique outgoing edge from the division point node in the second connected component, the first reduction rule configured for generating a new edge with a label which derived from the labels of the unique incoming edge and the unique outgoing edge; and a second reduction rule configured for identifying a node of the input graph or of a refined graph generated therefrom which includes a first incoming edge and a first outgoing edge for which the multiplicity of one of the first incoming edge and the first outgoing edge is greater than a degree of the node minus the multiplicity of the other of the first incoming edge and the first outgoing edge, where the degree of the node is a sum of incoming edges of the node, multiplied by their multiplicities, the second reduction rule being configured for merging the first incoming edge and the first outgoing edge to create a new edge with a label which is derived from the first incoming edge and the first outgoing edge; and outputting information based on the labels of the refined graph;

wherein at least one of the generating and refining is performed with a computer processor.

* * * * *